Dec. 14, 1937.   W. J. COULTAS   2,101,897
UNIVERSAL JOINT CONTROLLED CLUTCH
Filed May 11, 1935
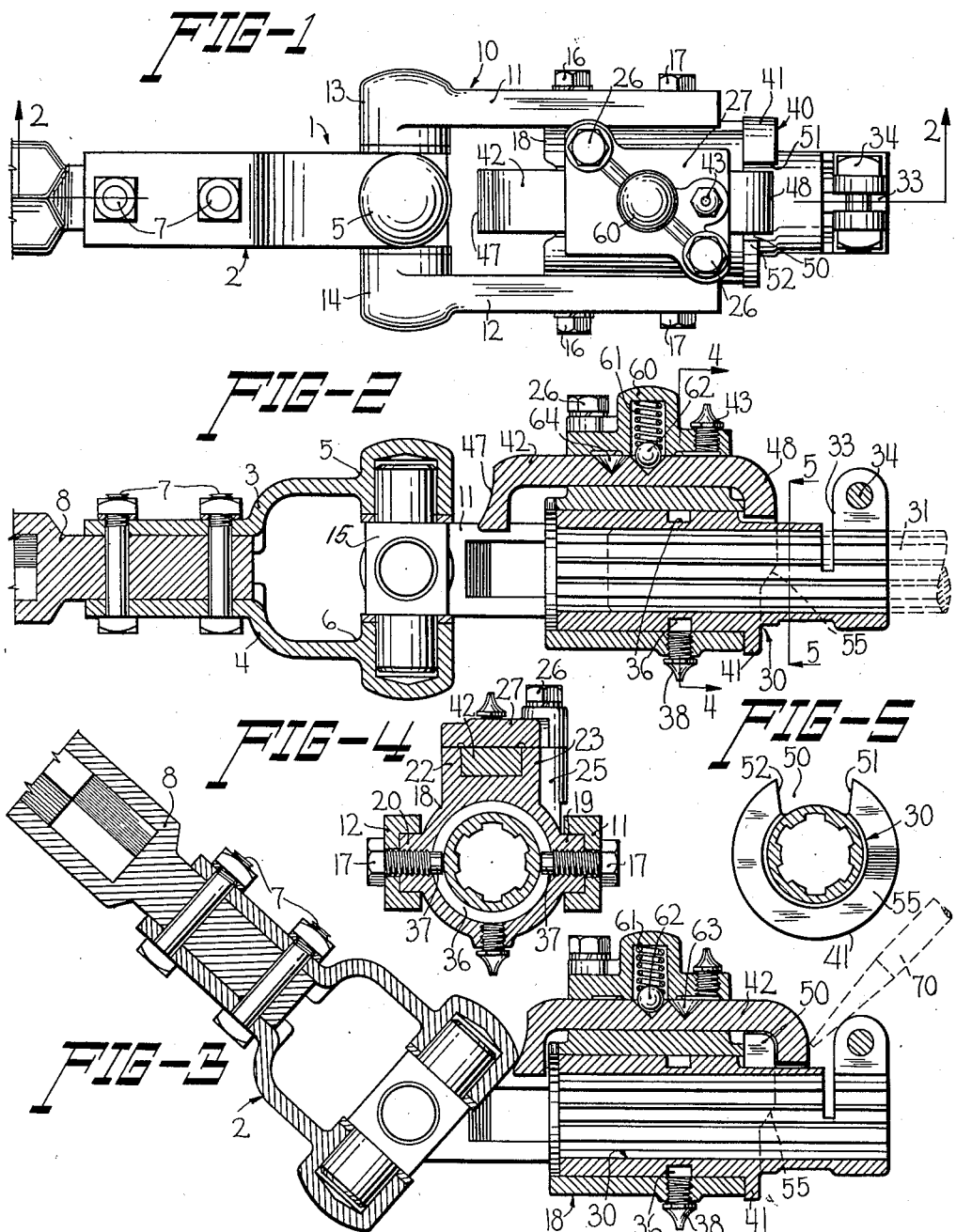
INVENTOR
Wilbur J. Coultas
BY Brown, Jackson, Boettcher & Dienner
ATTORNEYS.

Patented Dec. 14, 1937

2,101,897

UNITED STATES PATENT OFFICE 2,101,897

UNIVERSAL JOINT CONTROLLED CLUTCH

Wilbur J. Coultas, Moline, Ill., assignor to Deere & Company, Moline, Ill., a corporation of Illinois Application May 11, 1935, Serial No. 20,978

17 Claims. (Cl. 192—30)

The present invention relates generally to power transmitting devices and is more particularly concerned with certain improvements in universal joint controlled clutch mechanism serving, in the first instance, for connecting driving and driven shafts or other power transmitting parts, and, in the second instance, for automatically disconnecting or interrupting the drive when the universal joint is deflected beyond a predetermined angle.

As is well known, the conventional type of universal joint operates efficiently in the transmission of power only when not deflected beyond a certain angle. When the members which the universal joint connect are angled beyond this degree, excessive stresses and vibrations are set up, with consequent danger of breakage or binding and locking of the parts. However, within their working range, such joints are efficient and are used in many different kinds of machines. For example, in power driven mowers and the like, one or more universal joints are installed in the power line leading to the reciprocatory sickle bar. The latter is usually arranged in most mowers to swing rearwardly when brought into contact with an obstruction so as to clear the same to avoid breakage. In such cases, where the cutter bar swings back, the universal joint or joints may be angled beyond their efficient working angle. It has been proposed heretofore to provide an automatic disconnectible clutch responsive to an excessive angulation of the universal joint for disconnecting or interrupting the drive, but usually in such devices the drive is automatically restored as soon as the universal joint connection is brought back within its efficient working range.

The principal object of the present invention is the provision of a universal joint controlled mechanism operable to disconnect the drive upon the occurrence of excessive angulation in the universal joint and to retain the parts in their disconnected position, irrespective of any subsequent position of the universal joint parts, until the clutch mechanism has by a separate operation been restored to working position. Specifically, it is an object of the present invention to provided a universal joint and associated clutch mechanism including a shiftable part acted upon by biasing means serving to yieldingly hold the shiftable parts in either of two positions, one establishing the drive and the other interrupting the drive.

Still further, another object of the present invention is the provision of improved universal joint controlled clutch mechanism embodying a shiftable member responsive to excessive angulation of the universal joint means and so constructed and arranged that when the clutch mechanism has been moved toward its disconnected position, relative rotation between certain of the parts serves to positively move the clutch mechanism into its completely disconnected position.

These and other objects and advantages will be apparent to those skilled in the art after a consideration of the following detailed description of the preferred structural embodiment, taken in conjunction with the accompanying drawing, illustrating such embodiment.

In the drawing:

Figure 1 is a plan view of one form of the present invention;

Figure 2 is a section taken substantially along the line 2—2 of Figure 1, showing the parts with the clutch mechanism in driving relation;

Figure 3 is a view similar to Figure 2, showing the parts in the positions they occupy after the drive has been interrupted by excessive angulation of the universal joint means;

Figure 4 is a section taken substantially along the line 4—4 of Figure 2; and

Figure 5 is a fragmentary view taken along the line 5—5 of Figure 2 and looking in the direction of the arrows.

The reference numeral 1 indicates in its entirety the universal joint means which is more or less of conventional construction and embodies a first universal joint member 2 in the form of a pair of spaced straps 3 and 4 terminating in sockets or pivot arms 5 and 6 secured by any suitable means, such as bolts 7, to one end 8 of one of the shafts or a member operatively connected with and serving as a part of such a shaft. For example, the member 8 may be in the form of a slip connection with the driving or driven shaft proper. The other part or member of the universal joint means 1 is indicated by the reference numeral 10 and, similarly, comprises a pair of strap members 11 and 12 also terminating in pivot arms or sockets 13 and 14. A pivot block 15 having suitably formed studs is journaled in the sockets 5 and 6 of the first universal joint member and in the sockets 13 and 14 of the second universal joint member. The strap members 11 and 12, which may be in the form of channels as best shown in Figure 4, are secured by cap screws 16 and 17 to a sleeve member, indicated in its entirety by the reference numeral 18, having laterally arranged ridges 19 and 20 receiving the channeled strap members 11 and 12 and a pair of upstanding flanges 22 and 23 arranged longitudinally. One end of each of the flanged portions 22 and 23 is provided with a boss section 25, such sections being arranged in opposed relation as best shown in Figure 1, tapped to receive attaching cap screws 26 by which a cover plate member 27 is fastened in place. The cover plate member 27 will be referred to later.

The sleeve member 18, being rigidly secured to the universal joint strap members 11 and 12, actually serves as a part of the universal joint 1. The sleeve member 18 is journaled for relative rotation on a bushing 30 that is splined onto one end of the other shaft 31, indicated in dotted lines in Figure 2. The bushing member includes a slotted section 33 which is provided with a clamping bolt 34 for securely fixing the member 30 onto the shaft 31. An exteriorly facing groove 36 is provided on the bushing member 30 in a position to receive the inner extended ends 37 (Figure 4) of the attaching cap screws 17 carried by the sleeve member 18 for securing the same to the universal joint strap members 11 and 12. The screws 17 thus serve to hold the sleeve member on the bushing member to provide for relative rotation therebetween and to prevent any axial displacement thereof. A lubricant fitting 38 is provided for adequately lubricating these parts.

Suitable clutch mechanism is carried by the sleeve member 18 and cooperates with the bushing member 30 carried by the shaft 31 for releasably connecting the universal joint 1 and the shaft 31. Such clutch mechanism is indicated in its entirety in Figure 1 by the reference numeral 40 and includes a notched collar or flange 41 carried by or formed as a part of the bushing member 30, and a shiftable latch bar 42 disposed, as best shown in Figure 4, for axial sliding movement between the flanges 22 and 23 on the sleeve member 18, being held in place therein by the plate section 27. A fitting 43 is carried by the latter for lubricating the slidable latch or bar 42.

The slidable member 42 has its ends 47 and 48 formed as inwardly bent portions, the former being disposed closely adjacent the plane of rotation of the universal joint arm or socket sections 5 and 6, and the other end 48 is adapted to be disposed in a notch 50 formed in the collar member 41. One edge 51 of the notch is thicker than the other edge 52, so that the collar section 41 provides a cam surface 55, and as will be explained later, the cam surface is adapted to engage the inwardly bent end 48 for positively completing the movement of the shiftable bar 42 from one position to the other.

The plate member 27 is provided with an apertured boss 60 in which a spring 61 and a ball 62 are disposed, as best shown in Figures 2 and 3, and two recesses 63 and 64 are formed in the adjacent surface of the shiftable bar 42 in a position to receive the spring pressed ball 62 and to define two positions for the shiftable member 42. When the ball 62 enters the recess 63, as shown in Figure 2, the end 48 of the bar 42 is disposed, as best shown in Figure 1, within the notch 50, the action of the ball 62 serving to yieldingly hold the member 42 in this position. When disposed in this relation, the clutch mechanism 40 is in its engaged position so that, assuming the shaft 31 to be the driving part, the drive will be transmitted from the shaft 31 through the splined bushing or collar member 30 to the bar 42, and from the latter the drive will be transmitted to the sleeve member 18 and the universal joint 1, and thence to the other shaft section 8.

The drive will thus be transmitted uninterruptedly until the angle between the shaft sections 8 and 31 approaches an angle slightly less than the angle indicated in Figure 3. At that time one or the other of the parts 5 or 6 of the universal member 2 will come into contact with the downwardly bent end 47 of the shiftable member 42, and if the angle increases to that indicated in Figure 3, the continued rotation of the universal joint will cause one or the other, or both, of the socket sections 5 and 6 to strike the end 47 and to positively shift the slidable bar member 42 toward the position shown in Figure 3 in which the inwardly bent end 48 clears the notch 50. In the initial movement of the member 42 in this direction, the ball 62 is first forced upwardly against the tension of the spring 61, and at about the time the ball 62 is disposed on the ridge between the recesses 63 and 64, the end 48 clears the edge 52 of the collar 41 splined on the driving shaft 31, and then the bushing member 30 begins to rotate with respect to the sleeve member 18. This relative rotation brings the inclined section 55 (Figures 2 and 3) into operation, and as soon as this portion is brought into engagement with the end 48 of the member 42, the latter will be positively shifted completely into its other position in which the ball 62 enters the other recess 64, as best shown in Figure 3. Thus, in interrupting the drive, all that the universal joint part 2 has to do is to start the movement of the bar 42, for the cam section 55 completes the movement, cooperating with the spring pressed ball 62 in this operation. Of course, if the universal joint part 2 has been angled to the position shown in Figure 3, the shiftable part 42 will be positively forced into its disconnected position, entirely independent of either or both of the spring pressed ball 62 and the cam section 55.

As will be apparent from the above description, when the angulation between the driving and driven shafts exceeds a certain degree, the clutch mechanism 40 is positively actuated to interrupt the transmission of the drive. Once the clutch mechanism has been disconnected, it remains disconnected, irrespective of any subsequent positions of the universal joint parts, and even though, for example, the universal joint parts are subsequently returned to their straightened or aligned position. In order, therefore, for the drive to be restored, it is necessary that the shiftable member 42 be positively moved back into the position shown in Figure 2, and any suitable means, such as a screw driver or other tool 70, may be applied directly against the end 48 of the shiftable member 42, whereby the latter may be shifted from the position shown in Figure 3 back into the position shown in Figure 2. If the slotted portion 33 of the splined bushing member 30 is disposed in or brought to the position shown in Figures 1 and 3, the tool 70 or other means may be inserted in the space between the clamping ears and the end 48, and the member 42 pried back into the position shown in Figure 2.

When the combined universal joint and clutch mechanism is utilized as a part of the drive in a tractor mower or the like, the shaft 31 is preferably the driving shaft and is usually driven through the clutch of the tractor, in which case the shaft member 8 is suitably connected in any desired manner to drive the mower mechanism.

Now when the cutter bar of the mower strikes an obstruction, the cutter bar swings backwardly, and in doing so the universal joint 1 is angled into some position corresponding to that shown in Figure 3 and the drive interrupted as explained above. When the mower cutter bar swings back upon encountering an obstruction, the operator will, of course, immediately stop the tractor by disengaging the tractor clutch. This not only stops the forward travel of the tractor but it also stops the rotation of the power take-off shaft as well, the shaft 31 being connected with or serving as a part of the power take-off shaft. The operator then dismounts from the tractor, re-positions the cutter bar, and then throws in the universal joint controlled clutch 40 in the power take-off line by means of the screw driver 70 or other tool. At this time, since the main clutch of the tractor is disengaged, the power take-off shaft 31 is not rotating. After re-setting the universal joint controlled clutch 40, the operator again takes his position on the tractor and engages the main tractor clutch to start the forward movement of the tractor. In doing so, the power take-off shaft is thrown into operation at the same time, thereby reestablishing the drive of the cutting mechanism through the universal joint 1 and the clutch mechanism 40.

While I have described above the preferred structure in which the principles of the present invention have been embodied, it is to be understood that my invention is not to be limited to the details shown and described, but that, in fact, widely different means may be employed in the practice of the broader aspects of my invention.

What I claim, therefore, and desire to secure by Letters Patent is:

1. In combination, a pair of driving and driven shafts, a two-part universal joint having one part connected to rotate with one of said shafts and the other part connected to rotate with respect to the other of said shafts, means carried with said other universal joint part and movable with respect thereto for optionally connecting it to the associated shaft in driving relation, and means responsive to the degree of angulation between said driving and driven shafts for shifting said optionally movable means.

2. In combination, a pair of driving and driven shafts, a two-part universal joint having one part connected to rotate with one of said shafts and the other part connected to rotate with respect to the other of said shafts, clutch mechanism for connecting said rotatable universal joint part to the shaft with respect to which it is adapted to rotate, said clutch mechanism comprising a member fixed to the shaft and a second member shiftably mounted on said rotatable universal joint part and adapted in one position to engage the member fixed to the shaft, and means responsive to the degree of angulation between said shafts for shifting said second member.

3. In combination, driving and driven parts, a universal joint connected therebetween to provide for the transmission of power when said parts are disposed at an angle to one another, a sleeve member rotatably supported on the driving part and provided with a longitudinally movable member, cooperating means carried by said member and said driving part for releasably connecting them together, means connecting said sleeve member with said universal joint, and means carried by said longitudinal member and engageable by a portion of said universal joint when the angularity between said driving and driven parts exceeds a predetermined degree for shifting said movable member to disengage said sleeve member from said driving part.

4. In combination, driving and driven parts, a universal joint connected therebetween to provide for the transmission of power when said parts are disposed at an angle to one another, a sleeve member mounted for rotation on the driving part and operatively connected to drive said universal joint, and a shiftably mounted member carried by said sleeve member and adapted in one position to drive said sleeve member from said driving part, said shiftable member being adapted to be engaged by a portion of said universal joint when the angularity between said driving and driven parts exceeds a predetermined maximum for moving said shiftable member to disengage the drive between the driving part and said sleeve member.

5. In combination, driving and driven parts, a universal joint connected therebetween to provide for the transmission of power when said parts are disposed at an angle to one another, said universal joint including interconnected members, one rigidly connected with one of said parts and the other connected with the other part for relative rotation with respect thereto, and means releasably connecting said other universal joint member with said other part including a longitudinally shiftable member carried on said other universal joint member and having one portion releasably connected with said other part and another portion adapted to be engaged by at least a portion of said first universal joint member for interrupting the drive from said driving part to said driven part when the angle therebetween exceeds a certain predetermined maximum.

6. In combination, driving and driven parts, a universal joint connected therebetween to provide for the transmission of power when said parts are disposed at an angle to one another, said universal joint including a member rotatably carried by said driving part, a recessed member carried by said driving part adjacent said rotatable universal joint member, and a shiftable bar carried by said universal joint member and disposed in one position to engage and transmit the drive from said recessed member to said universal joint and in another position to interrupt the drive to the universal joint, said bar including a part engageable by a portion of the universal joint when the angularity between the driving and driven parts exceeds a predetermined maximum, whereby the bar is shifted to interrupt the drive.

7. In combination, a driving shaft, a driven shaft, a universal joint connected therebetween to provide for the transmission of power when said shafts are disposed at an angle to one another, said universal joint comprising a pair of strap members secured to one of said shafts and terminating in a pair of pivot arms, a second pair of strap members also having pivot arms, a pivot block operatively connected with said pairs of pivot arms, and a sleeve member rotatably disposed on the other of said shafts and carrying said second pair of universal joint strap members, and means carried by said sleeve member and arranged to releasably connect the latter with said other shaft, said means including a part adapted to be contacted by one of said first pair of pivot arms for interrupting the transmission of power through said universal joint when the angle between said shafts exceeds a predetermined degree.

8. In combination, driving and driven shafts, a notched collar splined onto one shaft, a universal joint having one part thereof connected to the other shaft, a sleeve member rotatably mounted on said first shaft and operatively connected to the other universal joint part, and a member slidably mounted on said sleeve and having one end adapted to engage said notched collar for releasably connecting said sleeve and said other shaft for transmitting the drive from one shaft to another through said universal joint, the other end of said slidable member being disposed in a position to be engaged by said one universal joint part when the angularity of the latter with respect to the other universal joint part exceeds a predetermined maximum.

9. In combination, driving and driven shafts, a universal joint connected with one of said shafts inclduing a sleeve member rotatably mounted on the other shaft, a notched collar carried by said other shaft adjacent said sleeve member, means biased for movement to either of two positions for releasably connecting said collar with said member, said means including a bar slidably mounted on said sleeve member and having an inwardly extending portion at one end adapted to engage in the notch of said collar, the other end of said slidably mounted bar being adapted to be engaged by a portion of said universal joint when the angularity between said driving and driven shafts exceeds a given maximum, so as to cause said bar to be disengaged from said collar upon the occurrence of said maximum angularity.

10. In combination, relatively rotatable parts, one including a cam member and the other including a sleeve mounted for rotation on said first part, said cam member having a flange formed with a radially directed notch and an axially facing cam surface, an axially shiftable member carried by said sleeve and having an end adapted to be disposed in said notch and a portion engageable with the cam surface of said notched cam member, and biased means tending to hold said shiftable member in either of two positions, one serving to establish a driving connection between said parts and the cam surface acting against said member, when the latter has been moved out of said one position toward the other position, to complete the movement thereof to said other position.

11. In combination, universal joint controlled clutch mechanism comprising, in combination, a splined member adapted to be mounted upon a driving shaft, means serving as a driving clutch member carried by said splined member, a sleeve journaled for rotation on said splined member, means serving as a universal joint connected with said sleeve, a shiftable member carried by the latter and including a portion serving as a driven clutch member and another portion adapted to be engaged by and moved by contact with at least a portion of said universal joint means, a plate member overlying said shiftable member, and spring pressed detent means carried by said plate member and cooperating with said shiftable member for yieldingly holding the same in either of two positions.

12. A universal joint controlled clutch mechanism comprising, in combination, a member adapted to be mounted upon a driving shaft, means serving as a driving clutch member carried by said first member, a sleeve journaled for rotation on said first member, means serving as a universal joint connected with said sleeve, and a shiftable member carried by the latter and including a portion serving as a driven clutch member and another portion adapted to be engaged by and moved by contact with at least a portion of said universal joint means.

13. In combination, a pair of relatively rotatable parts, one including a recessed member having a radially extending driving edge and an axially facing cam surface and the other including a sleeve journaled for rotation with respect to said first member, a shiftable member carried by said sleeve and movable axially thereof from one position to another, said shiftable member having a radially inwardly extending end adapted to be disposed in engaging relation with the driving edge of said recessed cam member whereby when said shiftable member is moved axially of said sleeve and said end is shifted out of engagement with said driving edge, said axially facing cam surface acts, upon relative rotation between said members, to complete the axial movement of said shiftable member into its other position, and means for moving said shiftable member longitudinally of said sleeve to shift said radially inwardly extending end out of engagement with said driving edge.

14. In combination, a driving shaft, a driven shaft, a universal joint connected therebetween to provide for the transmission of power when said shafts are disposed at an angle to one another, said universal joint including means secured to one of said shafts and serving as a pair of pivot arms, and a pair of strap members also having pivot arms, a pivot block operatively connected with said pairs of pivot arms, a sleeve member rotatably disposed on the other of said shafts and carrying said pair of universal joint strap members, and means movable with respect to said shafts and controlled by the angular movement of said pivot block in said strap members for releasably connecting said sleeve member and said other shaft.

15. In combination, a driving shaft, a driven shaft, a universal joint connected therebetween to provide for the transmission of power when said shafts are disposed at an angle to one another, said universal joint including means secured to one of said shafts and serving as a pair of pivot arms, and a pair of strap members also having pivot arms, a pivot block operatively connected with said pairs of pivot arms, a sleeve member rotatably disposed on and held against axial movement with respect to the other of said shafts and carrying said pair of universal joint strap members, a part slidably mounted on said sleeve member for establishing or disconnecting the drive through said universal joint, and means carried on said part adjacent the end of said one shaft between said universal joint strap members in a position to be engaged by one of said pivot arms when the angularity of the universal joint exceeds a given degree for the purpose of interrupting the transmission of power through the universal joint.

16. In combination, a pair of relatively rotatable parts, one including a recessed member having a radially extending driving edge and an axially facing cam surface and the other including a sleeve journaled for rotation with respect to said first member, a shiftable member carried by said sleeve and movable axially thereof from one position to another, and detent means for yieldingly retaining said shiftable member in either of two positions, said shiftable member having a radially extending end adapted to be disposed in engaging relation with the driving edge of said cam member whereby when said shiftable member is moved axially of said sleeve out of one of said positions and said end is shifted out of engagement with said driving edge, said axially facing surface acts, upon relative rotation between said members, to move said shiftable member so that said detent means acts to complete the axial movement of said shiftable member into its other position entirely out of engagement with said driving edge.

17. In combination, a pair of driving and driven shafts, a two-part universal joint having one part connected to rotate with one of said shafts and the other part connected to rotate with respect to the other of said shafts, a member carried with said other universal joint part and movable with respect thereto for connecting it to the associated shaft in driving relation, means responsive to the degree of angulation between said shafts for actuating said movable member, and detent means for yieldingly holding said movable member in its released position.

WILBUR J. COULTAS.